July 10, 1923.
Re. 15,645
M. TIBBETTS
VIBRATION DAMPING DEVICE
Original Filed May 27, 1915
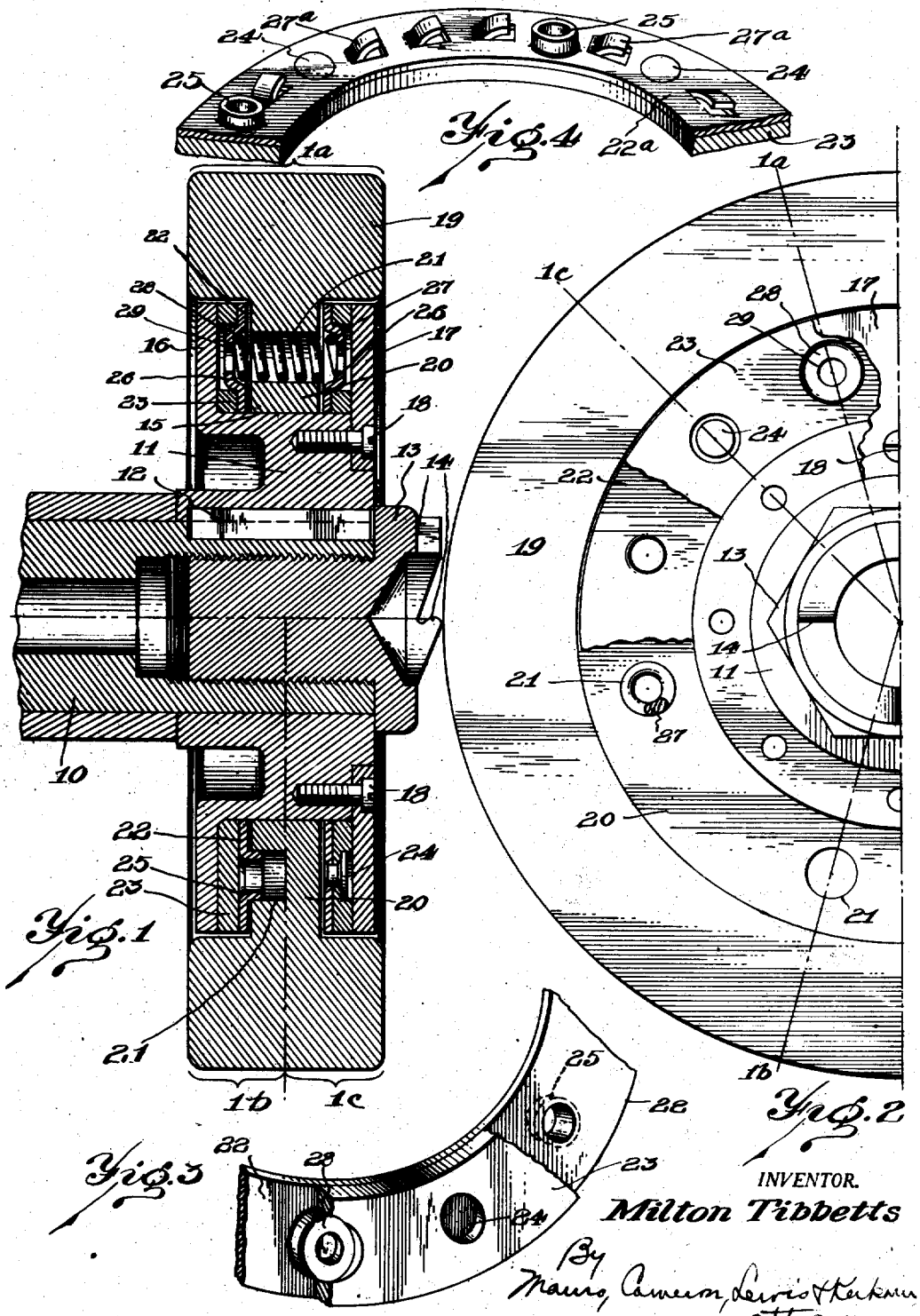
INVENTOR.
Milton Tibbetts
By Manning, Cameron, Lewis & Kirkman
Attorneys Reissued July 10, 1923.

Re. 15,645

UNITED STATES PATENT OFFICE

MILTON TIBBETTS, OF DETROIT, MICHIGAN, ASSIGNOR TO PACKARD MOTOR CAR COMPANY, OF DETROIT, MICHIGAN, A CORPORATION OF MICHIGAN.

VIBRATION DAMPING DEVICE

Original No. 1,225,057, dated December 16, 1919, Serial No. 30,770, filed May 27, 1915. Application for reissue filed December 15, 1921. Serial No. 522,700.

*To all whom it may concern:*

Be it known that I, MILTON TIBBETTS, a citizen of the United States of America, and a resident of Detroit, Michigan, have invented a new and useful Improvement in Vibration Dampng Devices, which invention is fully set forth in the following specification.

This invention relates to hydrocarbon motors and particularly to the construction of vibration dampers therefor. It forms an improvement upon the damper constructions illustrated in Letters Patent No. 1,085,443, dated January 27, 1914.

One of the objects of the invention is to provide a vibration damping device of simple and practical construction, and one in which the wearing parts may be easily removed and replaced.

Other objects of the invention will appear from the following descripton, taken in connection with the drawings which form a part of this specification, and in which:—

Figure 1 is a sectional view of a device embodying the invention, the upper half being substantially on the line $1^a$ of Fig. 2, the lower left hand side being on the line $1^b$, and the lower right hand side being on the line $1^c$ of said figure.

Fig. 2 is a front view of one half of the device shown in Fig. 1;

Fig. 3 is a perspective view of a section of one of the friction disks; and

Fig. 4 is a similar view of another form of disk.

Referring to the drawings, 10 represents one of the ends of a crank shaft of a hydrocarbon motor, preferably of the multi-cylinder type. The vibration damper is mounted upon and preferably entirely supported by this end of the crank shaft, and it comprises two relatively rotatable members, one of which is integrally formed with or secured or keyed to the crank shaft. In the form of the invention shown in Figs. 1 and 2, the inner member 11 is keyed to the crank-shaft as by the key 12 and secured thereon by a nut 13, which has teeth 14 on its outer face to cooperate with similar teeth on a starting crank, not shown.

The inner member 11 is formed with a cylindrical surface 15 and an integral friction plate portion 16 at one end of this cylindrical surface. At the other end, and spaced from the plate portion 16 is a detachable plate 17, fastened to the member 11 by the screws 18. It will be seen that the friction plates 16 and 17 are spaced apart some distance and the cylindrical surface 15, which is concentric with the axis of the crank shaft 10, is arranged between the plates.

The outer member of the damper comprises a heavy metallic ring 19, which may be called the flywheel part of the damper, and it is formed with an inwardly extending portion 20, in which are drilled several openings 21, for a purpose hereinafter described. This portion 20 is arranged between the friction plates 16 and 17 of the inner member 11, and its inner cylindrical surface is adapted to fit and have a bearing upon the cylindrical surface 15 of said member 11. Thus the flywheel 19 may rotate freely relative to the inner member except for the friction means hereinafter described, and it is held in place on the inner member by means of the detachable plate 17.

Frictional elements are introduced between the portion 20 of the flywheel and the friction plates 16 and 17, these elements as shown being in the form of stamped metal disks 22 having suitable lining or wearing material 23 suitably attached thereto as by the rivets 24. These disks, it will be seen, also fit loosely on the cylindrical surface 15 of the inner member, and may be removed and replaced with the fly-wheel 19 by removing the friction plate 17.

The disks 22 are preferably adapted to rotate with the fly-wheel 19, and they are therefore stamped with suitably spaced bosses 25 which are adapted to enter certain of the openings 21 so that the fly-wheel will carry the disks around with it. The disks are also stamped with recesses 26 suitably spaced so that they will register with certain others of the openings 21, and coiled springs 27 are arranged in those openings and adapted to have their ends seated in the recesses 26 of the disks. Thus the springs yieldingly tend to separate the disks 22 and press them in contact with the friction plates 16 and 17 of the inner member 11, thus causing a frictional driving connection between the inner member and the fly-wheel or outer member 19.

In forming the recesses 26, the metal is pressed outwardly at the other side of the disk and forms a boss 28 which enters an opening 29 cut in the lining material 23 and thereby assists in anchoring the lining to the disk 22.

It will be understood that any suitable number of openings 21 and corresponding bosses 25 and springs 27 may be employed, but in the form shown in Figs. 1 and 2 there are 8 of these openings, 4 of them being used for the bosses 25 and the other 4 for the spring houses.

Another form of friction disk is illustrated in perspective in Fig. 4. In this disk, the bosses 25 are the same as those shown in the disk above described, but in lieu of the springs 27, the disk 22[a] is formed with spring tongues 27[a], which are stamped at suitable points in the surface of the disk. The disk in this case is made of suitable spring material so that the spring means of the device is formed as an integral part of the friction disks.

Other and similar forms of the device may be used without departing from the spirit or scope of this invention.

What is claimed is:—

1. In a device of the class described, in combination, an inner member, an outer relatively rotatable inertia member, friction disks between said members, and means for yieldingly separating said disks to form a frictional driving connection between the members.

2. In a device of the class described, in combination, an inner member, an outer relatively rotatable inertia member, one of said members having a part arranged intermediate opposing plate parts of the other member, friction disks between the members, and means carried by said intermediate part for yieldingly operating the disks to secure a driving connection between the members.

3. In a device of the class described, in combination, an inner member having two spaced radial plate parts, one of said parts being removable, an outer relatively rotatable member having a part arranged between said plate parts, friction disks between said part of the outer member and said plate parts of the inner member, and springs operating on said disks for producing a frictional driving connection between said members.

4. In a device of the class described, in combination, an inner member having two spaced radial plate parts, one of said parts being removable, an outer relatively rotatable member having a part arranged between said plate parts, friction disks between said part of the outer member and said plate parts of the inner member, and springs carried by said part of the outer member and operating on said disks for producing a frictional driving connection between said members.

5. In a device of the class described, in combination, an inner member having two spaced radial plate parts, one of said parts being removable, an outer relatively rotatable member having a part arranged between said plate parts, friction disks between said part of the outer member and said plate parts of the inner member, and a series of springs each of which acts upon both said disks tending to separate them and thereby produce a frictional driving connection between said members.

6. In a device of the class described, in combination, an inner member having two spaced radial plate parts, one of said parts being removable, an outer relatively rotatable member having a part arranged between said plate parts, friction disks between said part of the outer member and said plate parts of the inner member, and coiled springs housed in said part of the outer member and operating on said disks for the purpose described.

7. In a device of the class described, in combination, an inner member, an outer inertia member, friction disks between said members, and means arranged between two of said disks and housed within one of said members, for yieldingly separating the disks to form a frictional driving connection between the members.

8. In a vibration damper, in combination, a shaft, an inner member comprising a pair of separated plates on said shaft, an outer inertia member rotatable relatively to the inner member and comprising a flywheel mounted between said plates, friction elements between the flywheel and the plates, and springs mounted in the flywheel and acting on said elements to produce a frictional driving connection for the flywheel.

9. In a vibration damper, in combination, a shaft, an inner member comprising a pair of separated plates on said shaft, an outer inertia member rotatable relatively to the inner member and comprising a flywheel mounted between said plates, a friction disk between each said plate and the adjacent side of the flywheel, and springs in the flywheel acting on the disks, for the purpose described.

10. In a vibration damper, in combination, a shaft, an inner member comprising a pair of separated plates on said shaft, an outer inertia member rotatable relatively to the inner member and comprising a flywheel mounted between said plates, a friction disk between each said plate and the adjacent side of the flywheel, and springs between said disks and the flywheel for pressing the disks into contact with the plates, for the purpose described.

11. In a vibration damper, in combination, a shaft, a member keyed thereto and having a cylindrical bearing surface and a friction plate, a flywheel having a bearing on said cylindrical surface, a friction disk on each side of said flywheel and having means causing them to turn therewith, a friction plate detachably secured to said member to retain said flywheel and disks in place, and spring means adapted to maintain a frictional driving connection between said member and said flywheel.

12. In a vibration damper, in combination, a shaft, a member keyed thereto and having a cylindrical bearing surface and a friction plate, a flywheel having a bearing on said cylindrical surface, a friction disk on each side of said flywheel and having means causing them to turn therewith, a friction plate detachably secured to said member to retain said flywheel and disks in place, and a series of coil springs housed in said flywheel and adapted to maintain a frictional driving connection between said member and said flywheel.

13. In a vibration damper, in combination, an inner member comprising separated plates, an outer member having a portion arranged between said plates and having openings in said portion, friction disks having stamped out portions to enter some of said openings to cause the disks to turn with the outer member, and springs arranged in others of said openings for operating said disks.

14. In a vibration damper, in combination, an inner member comprising separated plates, an outer member having a portion arranged between said plates and having openings in said portion, friction disks having stamped out portions to enter some of said openings to cause the disks to turn with the outer member, and springs arranged in others of said openings and pressing said disks apart and in frictional contact with said plates, for the purpose described.

15. In a vibration damper, in combination an inner member comprising separated plates, an outer member having a portion arranged between said plates and having openings in said portion, friction disks having stamped out portions to enter some of said openings to cause the disks to turn with the outer member, and having stamped recesses, and springs arranged in others of said openings and entering said recesses for pressing said disks apart and in frictional contact with said plates.

16. In a device of the class described, in combination, an inner member, an outer relatively rotatable inertia member, one of said members having a part arranged intermediate opposing plate parts of the other member, friction disks between the members, and means for yieldingly separating said disks to form a frictional driving connection between the members.

17. In a device of the class described, in combination, an inner member provided with a peripheral recess, an outer relatively rotatable member having a portion projecting into the peripheral recess of said inner member, friction disks between said members, and means for yieldingly separating said disks to form a frictional driving connection between the members.

18. In a device of the class described, in combination, an inner member provided with a peripheral recess, an outer relatively rotatable member having a portion projecting into the peripheral recess of said inner member, friction disks between the members, and means carried by the projecting portion of said outer member for yieldingly operating the disks to secure a driving connection between the members.

In testimony whereof I have signed this specification.

MILTON TIBBETTS.